United States Patent
Manku et al.

(10) Patent No.: US 10,264,405 B1
(45) Date of Patent: Apr. 16, 2019

(54) MOTION DETECTION IN MESH NETWORKS

(71) Applicant: Cognitive Systems Corp., Waterloo (CA)

(72) Inventors: Tajinder Manku, Waterloo (CA); Oleksiy Kravets, Petersburg (CA)

(73) Assignee: Cognitive Systems Corp., Waterloo, Ontatio ( * ) Notice: Subject to any disclaimer, the term of this patent is extended or adjusted under 35 U.S.C. 154(b) by 0 days.

(21) Appl. No.: 15/968,290

(22) Filed: May 1, 2018

Related U.S. Application Data

(60) Provisional application No. 62/595,270, filed on Dec. 6, 2017.

(51) Int. Cl.
*H04W 4/029* (2018.01)
*H04W 84/18* (2009.01)

(52) U.S. Cl.
CPC ............ *H04W 4/029* (2018.02); *H04W 84/18* (2013.01)

(58) Field of Classification Search
CPC .................................................... H04W 4/029
See application file for complete search history.

(56) References Cited

U.S. PATENT DOCUMENTS

| | | | |
|---|---|---|---|
| 4,054,879 A | 10/1977 | Wright et al. | |
| 4,649,388 A | 3/1987 | Atlas | |
| 4,740,045 A | 4/1988 | Goodson et al. | |
| 5,075,797 A | 12/1991 | Jones | |
| 5,270,720 A | 12/1993 | Stove | |
| 5,696,514 A | 12/1997 | Nathanson et al. | |
| 6,573,861 B1 | 6/2003 | Hommel et al. | |
| 7,652,617 B2 | 1/2010 | Kurtz et al. | |
| 8,660,578 B1 | 2/2014 | Yang et al. | |
| 9,030,321 B2 | 5/2015 | Breed | |
| 9,523,760 B1 | 12/2016 | Kravets et al. | |
| 9,524,628 B1 | 12/2016 | Omer et al. | |
| 9,584,974 B1 | 2/2017 | Omer et al. | |
| 9,743,294 B1 | 8/2017 | Omer et al. | |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Dekker , et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Mazda Sabouri
(74) *Attorney, Agent, or Firm* — Henry Patent Law Firm PLLC

(57) ABSTRACT

In a general aspect of the examples described, motion is detected based on received wireless signals in a mesh network. In an example, transfer function components for each pair of devices are obtained. A time series of transfer function matrices is generated, with each of the transfer function matrices comprising a respective subset of the transfer function components. Motion of an object in the space is detected based on the time series of transfer function matrices.

21 Claims, 5 Drawing Sheets

(56) References Cited

U.S. PATENT DOCUMENTS

| | | | |
|---|---|---|---|
| 9,927,519 B1 | 3/2018 | Omer et al. | |
| 9,933,517 B1 | 4/2018 | Olekas et al. | |
| 9,989,622 B1 | 6/2018 | Griesdorf et al. | |
| 10,004,076 B1 | 6/2018 | Griesdorf et al. | |
| 2003/0108119 A1 | 6/2003 | Mohebbi et al. | |
| 2007/0296571 A1 | 12/2007 | Kolen | |
| 2008/0119130 A1 | 5/2008 | Sinha | |
| 2008/0240008 A1 | 10/2008 | Backes et al. | |
| 2008/0258907 A1 | 10/2008 | Kalpaxis | |
| 2008/0303655 A1 | 12/2008 | Johnson | |
| 2009/0062696 A1 | 3/2009 | Nathan et al. | |
| 2010/0073686 A1* | 3/2010 | Medeiros | G01S 3/7864 356/615 |
| 2010/0127853 A1* | 5/2010 | Hanson | G01S 5/0289 340/539.13 |
| 2010/0130229 A1 | 5/2010 | Sridhara et al. | |
| 2010/0306320 A1* | 12/2010 | Leppanen | G06Q 10/10 709/206 |
| 2010/0315284 A1 | 12/2010 | Trizna et al. | |
| 2011/0019587 A1* | 1/2011 | Wang | H04L 63/08 370/254 |
| 2012/0115512 A1 | 5/2012 | Grainger et al. | |
| 2012/0146788 A1 | 6/2012 | Wilson et al. | |
| 2013/0094538 A1* | 4/2013 | Wang | H04B 1/707 375/141 |
| 2013/0113647 A1 | 5/2013 | Sentelle et al. | |
| 2013/0162459 A1 | 6/2013 | Aharony et al. | |
| 2013/0178231 A1* | 7/2013 | Morgan | G01S 5/0278 455/456.1 |
| 2013/0283256 A1 | 10/2013 | Proud | |
| 2014/0135042 A1 | 5/2014 | Buchheim et al. | |
| 2014/0148195 A1* | 5/2014 | Bassan-Eskenazi | G01S 11/02 455/456.1 |
| 2014/0247179 A1 | 9/2014 | Furuskog | |
| 2014/0286380 A1 | 9/2014 | Prager et al. | |
| 2014/0329540 A1* | 11/2014 | Duggan | H04W 4/02 455/456.1 |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0195100 A1 | 7/2015 | Imes et al. | |
| 2015/0245164 A1 | 8/2015 | Merrill | |
| 2015/0338507 A1 | 11/2015 | Oh et al. | |
| 2016/0018508 A1 | 1/2016 | Chen et al. | |
| 2016/0088438 A1* | 3/2016 | O'Keeffe | H04W 4/21 455/456.2 |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2016/0262355 A1* | 9/2016 | Swan | A01K 29/005 |
| 2017/0042488 A1 | 2/2017 | Muhsin | |
| 2017/0052247 A1* | 2/2017 | Kong | G01S 5/0289 |
| 2017/0055126 A1* | 2/2017 | O'Keeffe | H04W 4/21 |
| 2017/0055131 A1* | 2/2017 | Kong | H04W 4/027 |
| 2017/0146656 A1 | 5/2017 | Belsley et al. | |
| 2017/0278374 A1 | 9/2017 | Skaaksrud | |
| 2017/0280351 A1 | 9/2017 | Skaaksrud | |
| 2017/0311279 A1 | 10/2017 | Allegue Martinez et al. | |
| 2017/0311574 A1* | 11/2017 | Swan | A01K 29/005 |
| 2017/0343658 A1 | 11/2017 | Ramirez et al. | |

FOREIGN PATENT DOCUMENTS

| | | |
|---|---|---|
| WO | 2014/021574 | 2/2014 |
| WO | 2014/201574 | 12/2014 |
| WO | 2015/168700 | 11/2015 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017/210770 | 12/2017 |
| WO | 2018/094502 | 5/2018 |

OTHER PUBLICATIONS

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.

WIPO, International Search Report and Written Opinion dated Dec. 21, 2018 in PCT/CA2018/051106, 8 pgs.

* cited by examiner

MOTION DETECTION IN MESH NETWORKS

CROSS-REFERENCE TO RELATED APPLICATIONS

This application claim priority to provisional application 62/595,270, filed Dec. 6, 2017, entitled "Motion Detection in Mesh Networks." The priority application is hereby incorporated by reference.

BACKGROUND

The following description relates to motion detection in mesh networks.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DETAILED DESCRIPTION

Figure 1:
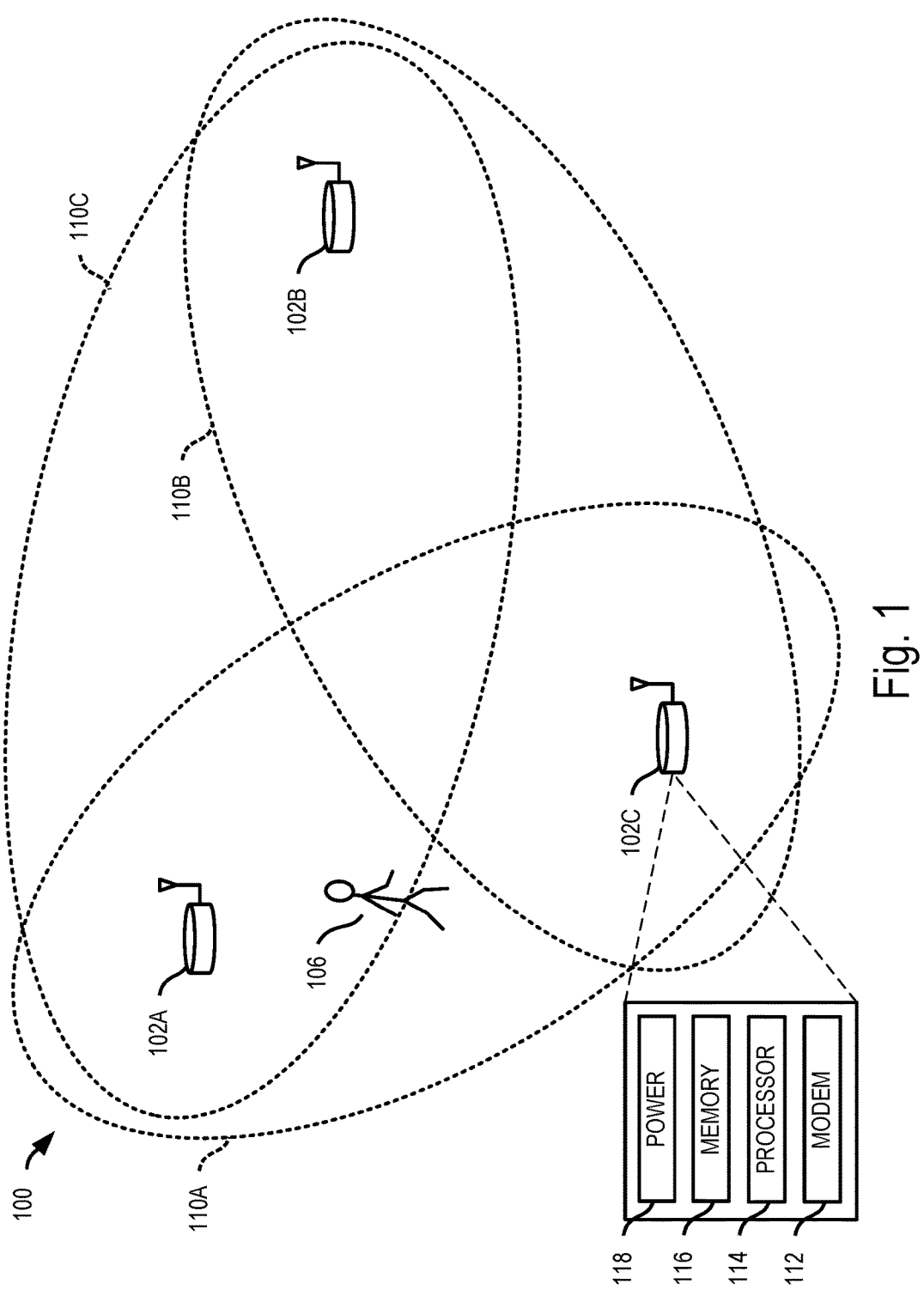
FIG. 1 is a diagram showing an example wireless communication system.

In some aspects of what is described here, motion in a space can be detected using information from multiple wireless communication devices communicating in the space (e.g., through a wireless mesh network). For instance, wireless signals received at each of the devices in a wireless communication network may be analyzed to determine channel information for the different communication links in the network (between respective pairs of devices in the network). The channel information may be representative of a transfer function applied to wireless signals that traverse the space, and may be referred to as transfer function components. In some instances, the channel information includes channel state information. Channel state information may refer to known channel properties of a communication link, and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming matrix may include a mathematical description of how the antenna array should use each of its individual antenna elements to select a spatial path for transmission. Although certain aspects are described herein with respect to channel state information, beamforming state information or beamformer steering matrix state may be used in the aspects described as well.

The channel information for each of the communication links may then be analyzed (e.g., by a hub device in the network, or a remote device communicably coupled to the network) to detect whether motion has occurred in the space, determine a relative location of the detected motion, or both. In some implementations, the wireless communication network includes a wireless mesh network. A wireless mesh network may refer to a decentralized wireless network whose nodes (devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard, which is hereby incorporated by reference. In some instances, a wireless mesh network is based on WI-FI ad hoc or another proprietary technology.

In some implementations, the channel information for the respective communication links may be analyzed by a neural network to detect motion or determine a location of detected motion. For example, a neural network may be trained by a user of a network by gathering channel information from the devices of the network as the user walks through the space. The channel information may be tagged according to whether the user is currently moving, according to a location of the user, or in another manner. The tagged channel information may be analyzed by the neural network to train the neural network to detect motion of an object, a category of motion (e.g., motion by a human vs. a pet), or a location of detected motion based on untagged channel information.

In some implementations, the channel information for respective links of each pair of devices (also referred to as transfer function components) in a communication system is obtained at a first time point, and at subsequent time points thereafter. In some implementations, transfer function matrices are generated with the obtained channel information at each time period, e.g. a time series of transfer function matrices, in which each transfer function matrix comprises a subset of the transfer function components (e.g., the subset associated with a particular time point or time frame). Motion may be detected by analyzing the channel information of the transfer function matrices of the communication system over time, e.g. at different time points in the time series.

Aspects of the present disclosure may provide one or more advantages in some instances. For example, motion may be detected based on wireless signals without the need for a line-of-sight between devices. Motion may be detected using existing wireless communication devices and networks. In addition, motion may be detected using a neural network that analyzes aspects of wireless signals in an efficient manner. In other aspects, analysis of the system over time, e.g. analysis of a time series, may determine whether an object is moving closer to a particular device in the system, and may also determine the size of the object moving and the pattern it creates.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

As shown in FIG. 1, the example wireless communication device 102C includes a modem 112, a processor 114, a memory 116, and a power unit 118; any of the wireless communication devices 102A, 102B, 102C in the wireless communication system 100 may include the same, additional or different components, and the components may be configured to operate as shown in FIG. 1 or in another manner. In some implementations, the modem 112, processor 114, memory 116, and power unit 118 of a wireless communication device are housed together in a common housing or other assembly. In some implementations, one or more of the components of a wireless communication device can be housed separately, for example, in a separate housing or other assembly.

The example modem 112 can communicate (receive, transmit, or both) wireless signals. For example, the modem 112 may be configured to communicate radio frequency (RF) signals formatted according to a wireless communication standard (e.g., Wi-Fi or Bluetooth). The modem 112 may be implemented as the example wireless network modem 112 shown in FIG. 1, or may be implemented in another manner, for example, with other types of components or subsystems. In some implementations, the example modem 112 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the modem 112 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the modem 112 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example modem 112 receives baseband signals from the baseband subsystem, up-converts the baseband signals to radio frequency (RF) signals, and wirelessly transmits the radio frequency signals (e.g., through an antenna). In some instances, the radio subsystem in the example modem 112 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example modem 112 can communicate wireless network traffic (e.g., data packets) in the wireless communication network through the radio subsystem on one or more network traffic channels. The baseband subsystem of the modem 112 may also transmit or receive (or both) signals (e.g., motion probe signals or motion detection signals) through the radio subsystem on a dedicated wireless communication channel. In some instances, the baseband subsystem generates motion probe signals for transmission, for example, to probe a space for motion. In some implementations, the motion probe signals include standard signaling or communication frames that include standard pilot signals used in channel sounding (e.g., channel sounding for beamforming according to the IEEE 802.11ac-2013 standard, which is hereby incorporated by reference). In some cases, the motion probe signals include reference signals known to all devices in the network. In some instances, the baseband subsystem processes received motion detection signals (signals based on motion probe signals transmitted through the space), for example, to detect motion of an object in a space. For example, the baseband subsystem may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 114 can execute instructions, for example, to generate output data based on data inputs. The instructions can include programs, codes, scripts, or other types of data stored in memory. Additionally, or alternatively, the instructions can be encoded as pre-programmed or re-programmable logic circuits, logic gates, or other types of hardware or firmware components. The processor 114 may be or include a general-purpose microprocessor, as a specialized co-processor or another type of data processing apparatus. In some cases, the processor 114 performs high level operation of the wireless communication device 102C. For example, the processor 114 may be configured to execute or interpret software, scripts, programs, functions, executables, or other instructions stored in the memory 116. In some implementations, the processor 114 may be included in the modem 112.

The example memory 116 can include computer-readable storage media, for example, a volatile memory device, a non-volatile memory device, or both. The memory 116 can include one or more read-only memory devices, random-access memory devices, buffer memory devices, or a combination of these and other types of memory devices. In some instances, one or more components of the memory can be integrated or otherwise associated with another component of the wireless communication device 102C. The memory 116 may store instructions that are executable by the processor 114. For example, the instructions may include instructions for analyzing channel information to detect motion of an object in a space, such as through one or more of the operations of the example process 400 of FIG. 4 or the example process 500 of FIG. 5.

The example power unit 118 provides power to the other components of the wireless communication device 102C. For example, the other components may operate based on electrical power provided by the power unit 118 through a voltage bus or other connection. In some implementations, the power unit 118 includes a battery or a battery system, for example, a rechargeable battery. In some implementations, the power unit 118 includes an adapter (e.g., an AC adapter) that receives an external power signal (from an external source) and coverts the external power signal to an internal power signal conditioned for a component of the wireless communication device 102C. The power unit 118 may include other components or operate in another manner.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., as described above), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 4-5, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion. In this example, a communication device 102C transmitting wireless signals may be referred to as a source device, communication devices 102A, 102B that receive and process wireless signals may be referred to as sensor devices.

The wireless signals used for motion detection can include, for example, a beacon signal (e.g., Bluetooth Beacons, Wi-Fi Beacons, other wireless beacon signals), pilot signals (e.g., pilot signals used for channel sounding, such as in beamforming applications), or another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 is a wireless mesh network, with wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

Figure 2B:
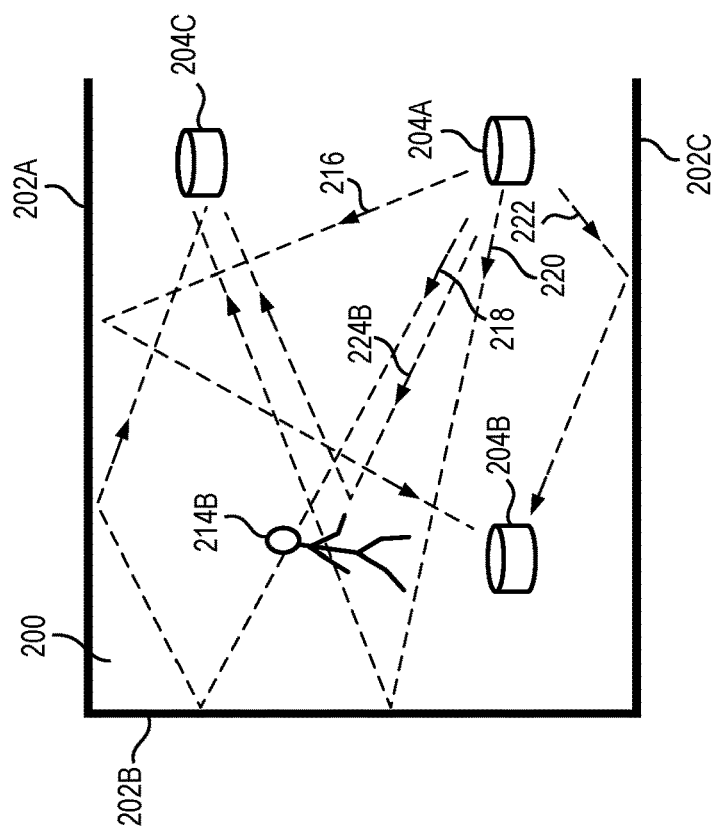
FIGS. 2A and 2B are diagrams showing example wireless signals communicated between wireless communication devices.
Figure 2A:
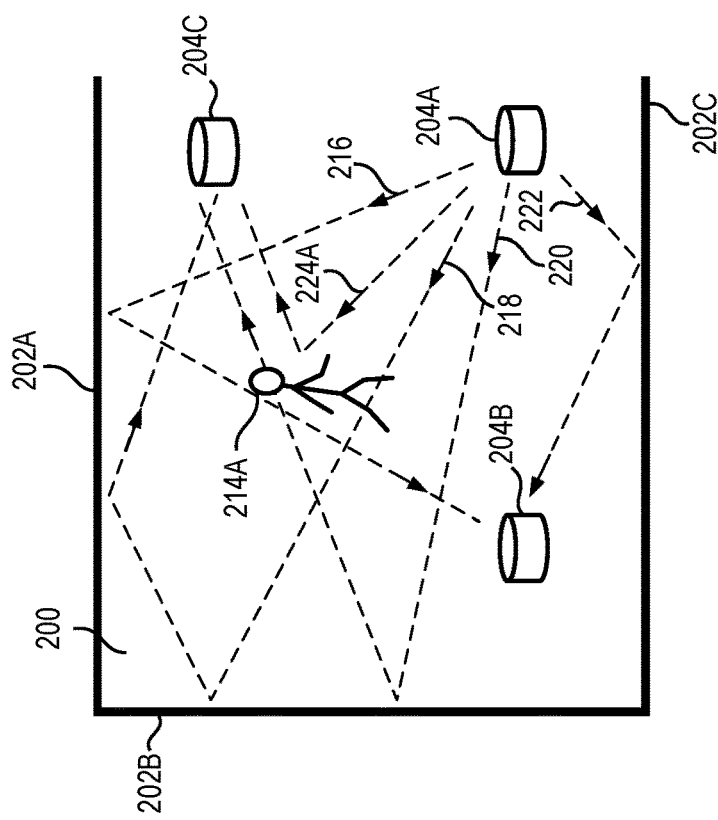

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.). The second and third wireless communication devices 204B, 204C are operable to receive signals based on the motion probe signals transmitted by the wireless communication device 204A. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard, which is hereby incorporated by reference). The wireless communication devices 204B, 204C each have a modem, processor, or other component that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omni-directional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal $f(t)$ transmitted from the first wireless communication device 204A may be described according to Equation (1):

$$f(t) = \sum_{n=-\infty}^{\infty} c_n e^{j\omega_n t} \tag{1}$$

where $\omega_n$ represents the frequency of $n^{th}$ frequency component of the transmitted signal, $c_n$ represents the complex coefficient of the $n^{th}$ frequency component, and t represents time. With the transmitted signal $f(t)$ being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \tag{2}$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k(t)$ from all paths to the wireless communication device, which is shown in Equation (3):

$$R = \sum_k r_k(t) \tag{3}$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \tag{4}$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For the frequency of an nth frequency component of the transmitted signal $\omega_n$, a complex value $Y_n$ may be represented as follows in Equation (5):

$$Y_n = \sum_k c_n \alpha_{n,k} e^{j\phi_{n,k}}. \tag{5}$$

The complex value $Y_n$ for a given frequency component $\omega_n$ indicates a relative magnitude and phase offset of the received signal at that frequency component on. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Thus, in some implementations, the complex value $Y_n$ for each of multiple devices in a wireless mesh network can be analyzed to detect whether motion has occurred in a space traversed by the transmitted signals $f(t)$.

Figure 3:
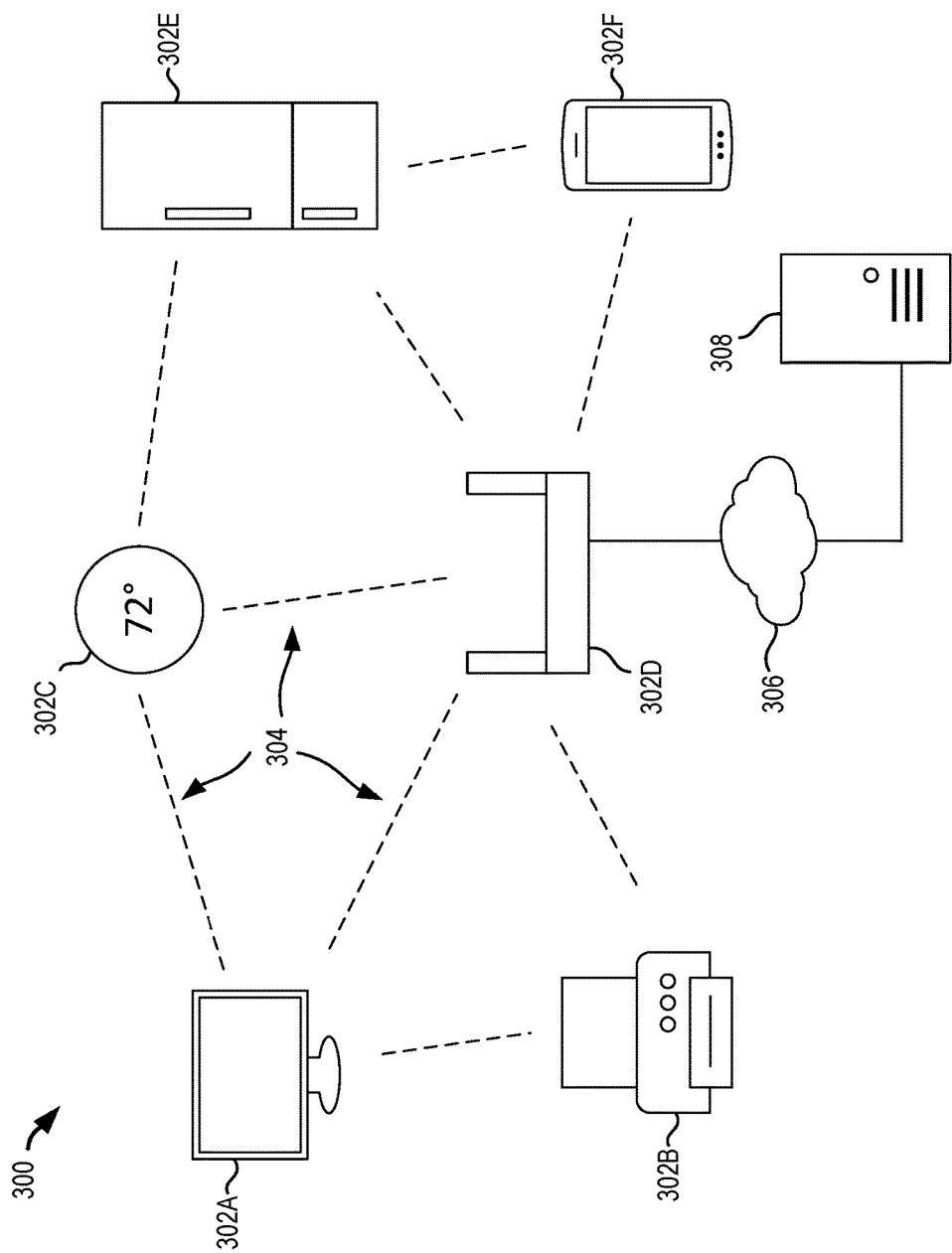
FIG. 3 is a diagram of an example wireless mesh network.

FIG. 3 is a diagram of an example wireless mesh network 300. The example wireless mesh network 300 includes multiple wireless communication devices 302 that communicate with each other over different wireless communication links 304. The wireless communication devices 302 may communicate using radio frequency (RF) signals (e.g., Wi-Fi signals) in some cases. In the example shown, the wireless mesh network 300 includes a computer 302A, a printer 302B, a thermostat 302C, a wireless router 302D, a refrigerator 302E, and a mobile device 302F. The wireless mesh network 300 may include additional, fewer, or different types of wireless communication devices 302 than those shown in FIG. 3. As shown in FIG. 3, certain wireless communication devices 302 may form communication links with other wireless communication devices 302 that are relatively close to them.

In the example shown, a value of $Y_n$ according to Equation (5) above may be computed for each communication link between a respective pair of wireless communication devices 302. The values for the different links in the network 300 may then be analyzed to detect whether motion has occurred in the space traversed by the wireless signals transmitted by the devices 302. For example, in some implementations, the values of $Y_n$ may be compiled into a matrix:

$$Y_n = \begin{pmatrix} Y_n^{A,A} & Y_n^{A,B} & Y_n^{A,C} & Y_n^{A,D} & Y_n^{A,E} & Y_n^{A,F} \\ Y_n^{B,A} & Y_n^{B,B} & Y_n^{B,C} & Y_n^{B,D} & Y_n^{B,E} & Y_n^{B,F} \\ Y_n^{C,A} & Y_n^{C,B} & Y_n^{C,C} & Y_n^{C,D} & Y_n^{C,E} & Y_n^{C,F} \\ Y_n^{D,A} & Y_n^{D,B} & Y_n^{D,C} & Y_n^{D,D} & Y_n^{D,E} & Y_n^{D,F} \\ Y_n^{E,A} & Y_n^{E,B} & Y_n^{E,C} & Y_n^{E,D} & Y_n^{E,E} & Y_n^{E,F} \\ Y_n^{F,A} & Y_n^{F,B} & Y_n^{F,C} & Y_n^{F,D} & Y_n^{F,E} & Y_n^{F,F} \end{pmatrix} \quad (6)$$

where $Y_n^{\alpha,\beta}$ represents the value $Y_n$ according to equation (5) above for the communication link between wireless communication device $\alpha$ and wireless communication device $\beta$ (e.g., $Y_n^{B,D}$ represents the value $Y_n$ for the link between devices 302B, 302D of FIG. 3). In some cases, $\alpha$ may represent the transmitter device and $\beta$ may represent the receiver device. Some of the components in the matrix (6) may be zero where there is no connection between the respective devices $\alpha$ and $\beta$. For instance, where $\alpha=\beta$, the element of the matrix (6) may be zero. In another instance, the element of the matrix (6) corresponding to $Y_n^{B,E}$ may be zero because no link exists between devices 302B and 302E in FIG. 3.

The matrix (6) can be generated for different points in time ("snapshots"), and changes in the matrix over time can be analyzed to detect whether motion has occurred in the space. For example, the difference between one snapshot to another snapshot of $Y_n$ may be represented by $$\Delta Y_n(t) = Y_n(t) - Y_n(t-\tau) \quad (7)$$

where $\tau$ represents the time difference between snapshots. A function based on $\Delta Y$ of Equation (7) (i.e., $f(\Delta Y)$) may be analyzed to detect whether motion has occurred. For example, an average value of $\Delta Y_n(t)$ over frequency ($\overline{Y}$) may be computed and analyzed, the standard deviation of $\Delta Y_n(t)$ may be computed and analyzed, or another value may be computed and analyzed. Motion of an object will affect patterns in the output of the function $f(\Delta Y)$ that can be learned (e.g., using a neural network). Similarly, different categories of motion (e.g., motion by a human vs. motion by a dog) will affect different patterns in the output of the function $f(\Delta Y)$ that can be learned (e.g., using a neural network). In addition, a relative location of detected motion (relative to the devices 302) can be learned. For example, where a network includes two devices 302, the matrix $$Y_n = \begin{pmatrix} 0 & Y_n^{1,2} \\ Y_n^{2,1} & 0 \end{pmatrix} \quad (8)$$

will be generated. The matrix than can be analyzed to determine if the object moving closer to device 1 or device 2, by learning these two cases. For example, if device 1 reports a substantially larger detected channel variation compared to device 2, then the designated device may determine that an object was moving in closer proximity to device 2. Similarly, if device 1 reports a substantially smaller detected channel variation compared to device 2, then the designated device may determine that an object was moving in closer proximity to the device 1. States in between these two states (close to one device vs. the other) may also be determined. For example, if the detected channel variation is approximately the same as both wireless devices, the designated device may determine that the detected motion occurred in a "middle zone" between the two devices.

In some cases, because of delays in communication between devices of the network 300 or other delays, the elements of the matrix (6) may not be associated with the same time as one another. For instance, in some cases, the elements of the matrix (6) are based on snapshots that are within approximately 1 to 2 seconds of each other.

In some implementations, the matrix (6) may be analyzed by a device 302 of the network 300. For example, one of the wireless communication devices 302 may be designated as a "hub" device that obtains the values $Y_n^{\alpha,\beta}$ for the various communication links, generates the matrix representation (e.g., matrix (6) above), and analyzes matrix representation to detect whether motion occurred, a category of motion that occurred, a relative location of the detected motion, or another indication. In some implementations, a device communicably coupled to the network 300 performs these operations. For instance, referring to the example shown in FIG. 3, the server 308 communicably coupled to the wireless mesh network 300 via network 306 (e.g., the Internet) may analyze the values of $Y_n^{\alpha,\beta}$ for the respective communication links to detect whether motion occurred in the space served by the wireless mesh network 300.

Figure 4:
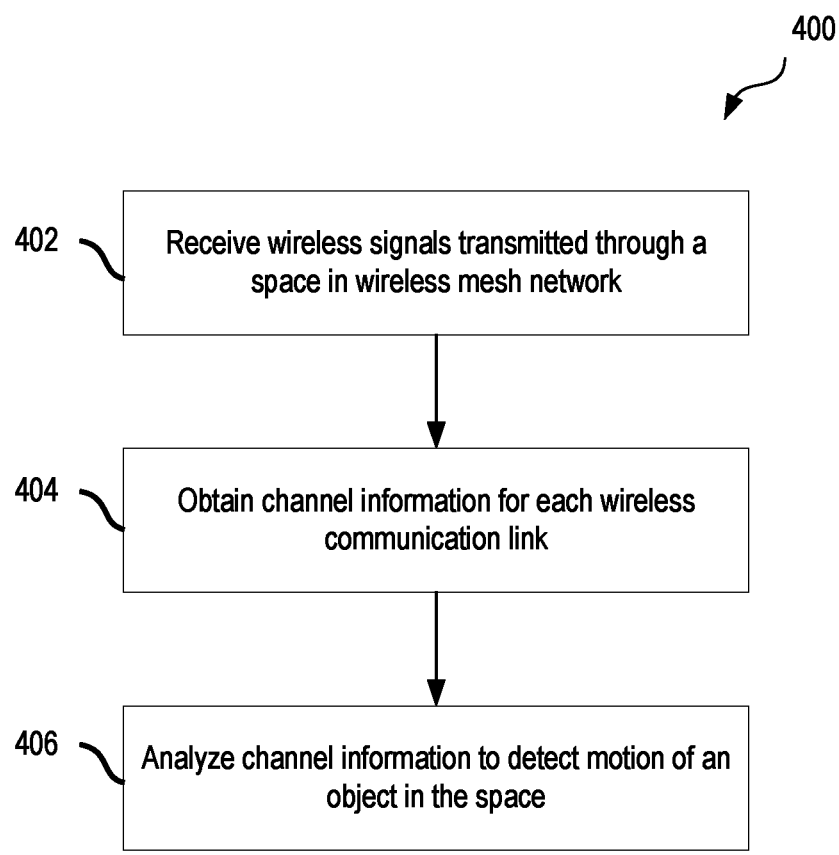
FIG. 4 is a flow diagram showing an example process for detecting motion of an object in a space based on channel information.

FIG. 4 is a flow diagram showing an example process 400 for detecting motion of an object in a space based on channel information. Operations of the process 400 may be performed by one or more processors of a device coupled to a wireless network that serves the space. For example, operations in the example process 400 may be performed by the processor subsystem 114 of the example wireless communication devices 102 in FIG. 1 to identify patterns in channel information for different communication links in the system 100 over time and detect whether motion has occurred in the space. The example process 400 may be performed by another type of device. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in another order, performed in parallel, iterated, or otherwise repeated or performed another manner.

At 402, wireless signals transmitted through a space are received at different wireless communication devices of a network. For instance, referring to the example shown in FIG. 3, wireless signals transmitted by one or more of the devices 302 are received at the other devices 302 of the mesh network 300. The wireless signals may be radio frequency (RF) signals, and may include reference or beacon signals used to determine whether motion has occurred in the space. In some cases, the wireless signals are formatted according to a standard (e.g., the 802.11 Wi-Fi standard). The wireless signals may be formatted in another manner.

At 404, channel information is obtained for each wireless communication link in the network based on the wireless signals received at 402. The channel information may be computed based on the wireless signals received at 402. For example, the channel information for each link in the network may be the value $Y_n$ according to Equation (5) above. The channel information may be computed by the individual wireless communication devices of the network, or may be determined by another device. For instance, referring to the example shown in FIG. 3, the channel information for each link may be computed at each respective device 302, and then transmitted to the server 308 through network 306. In some implementations, the channel information for each of the respective links is compiled into a matrix representation, such as the one shown in matrix (6) above. The channel information may be compiled for different "snapshots" of time over a time period. For example, the matrix (6) above may be compiled for channel information obtained at different points in time. For instance, a matrix $Y_n(t)$ may be generated for a first time point, a matrix $Y_n(t+1)$ may be generated for a second time point, and so forth, which cumulatively may be referred to as a time series of transfer function matrices.

At 406, the channel information obtained in 404 is analyzed to detect whether motion occurred in the space served by the network. The analysis may include a comparison of the snapshots of channel information over a time period. For instance, the difference between signals at adjacent points in time may be determined, as described above with respect to Equation (7) ($\Delta Y_n(t)$). In some implementations, the channel information may be analyzed using a function ($f(\Delta Y)$, e.g., average, standard deviation, etc.) that is based on the comparison, as described above.

In some instances, the channel information obtained at 404 is further analyzed to determine a relative location of the motion detected at 406. For example, the matrix representation may be analyzed as described above with respect to Equation (8) to determine a location of detected motion relative to various wireless communication devices in the network. In some instances, a category of motion may be determined based on the analysis of the channel information. For instance, the analysis may determine that a human is moving in the space, or may determine that a dog is moving in the space (or both).

In some implementations, a neural network may be used to analyze the channel information at 406. For example, a neural network (convolutional or fully connected) may be trained using the tagged channel information, and once trained, newly computed channel information can be input to the neural network to provide an output that indicates whether motion occurred in the space. For example, in some instances, sets of tagged channel information may be used to train a neural network system that includes a convolutional neural network. The tagged channel information may include a matrix similar to matrix (6) above, and may also include an indication of whether motion occurred in the space during the time period associated with the matrix. The channel information may be tagged with such an indication based on an analysis performed on the channel information, based on information gathered during a learning phase (e.g., a user walking through a space and providing an indication of movement so the system can learn motion states and associated channel information), or based on another analysis.

Once trained, the neural network system may be used to detect whether motion has occurred in a space based on untagged channel information. The untagged channel information may be formatted in the same manner as the tagged channel information, but without an indication of whether motion occurred. The neural network system may process the untagged channel information using nodes that were programmed during the training process to provide an output that includes an indication of whether motion occurred (or where motion occurred) in the space. The neural network system may include a convolutional neural network system, a fully-connected neural network system, or both.

In some implementations, training the neural network system include parameterizing nodes of the neural network system. For instance, the neural network system may determine weights and a bias for each node in the system according to a cost function minimization operation. The weights may be determined based on tagged channel information. Each node in a layer may then weight and bias its inputs (e.g., untagged channel information) according to the determined weights. For instance, a node may provide an output according to $$a_{i+1} = b + \sum_j w_{i,j} a_{i,j} \tag{9}$$

where $a_{i+1}$ refers to the output of the node, b refers to the bias the node provides, $w_{i,j}$ refers to the weight applied to an output from a node of a previous layer $a_{i,j}$. The cost functions to be minimized may include:

$$C = -\frac{1}{n} \sum_i \sum_j [y_{j(i)} * \ln(a^L_{j(i)}) + (1 - y_{j(i)}) * \ln(1 - a^L_{j(i)})]. \tag{10.a}$$

$$C = -\frac{1}{n} \sum_i \sum_j \left[ x^i \left( 1\{y_{j(i)} = a^L_{j(i)}\} - \frac{e^{a^L_{j(i)}}}{\sum_j e^{a^L_{j(i)}}} \right) \right]. \tag{10.b}$$

where $x^i$ is the $i^{th}$ tagged input to neuron j of layer L. Equation (10.a) is the cost function for sigmoid activation and Equation (10.b) is the cost function for soft-max activation. In equation (10.b) the curly brackets define the binary result of whether the output of the node matches the theoretical output, with a matching result providing an output of one (1), otherwise zero (0). The cost function C may be minimized using a gradient of decent methodology. For instance, the gradients of decent may be $$\frac{\partial C}{\partial w_j} = \frac{1}{n}\sum_x x_j(\sigma(z)-y) \quad (11)$$

and $$\frac{\partial C}{\partial b} = \frac{1}{n}\sum_x (\sigma(z)-y) \quad (12)$$

where $\sigma(z)$ represents the Sigmoid function or Rectified Linear Unit (ReLU)

$$S(x) = \frac{e^x}{e^x+1}. \quad (13.a)$$

$$\text{ReLU}(x) = \max(0,x). \quad (13.b)$$

In some instances, the weights may be initialized to have a normal distribution after iterations of gradient of decent-based training. In some implementations, the tagged input data is processed by the neural network trainer 608 to determine output values based on a current set of weights. A ground truth can then be used with the output values to back propagate error and compute the gradient of decent according to the above equations.

In some implementations, the neural network system includes a convolutional neural network that includes multiple layers. For example, the neural network system may include multiple convolutional layers, a max-pooling layer after at least one of the convolutional layers, a flattening layer after the max-pooling layer, and multiple dense (fully-connected) layers after the flattening layer. As one example, the neural network system may be configured with two convolutional layers, a max-pooling layer after the two convolutional layers, a third convolutional layer after the max-pooling layer, a flattening layer after the third convolutional layer, and four dense layers.

Figure 5:
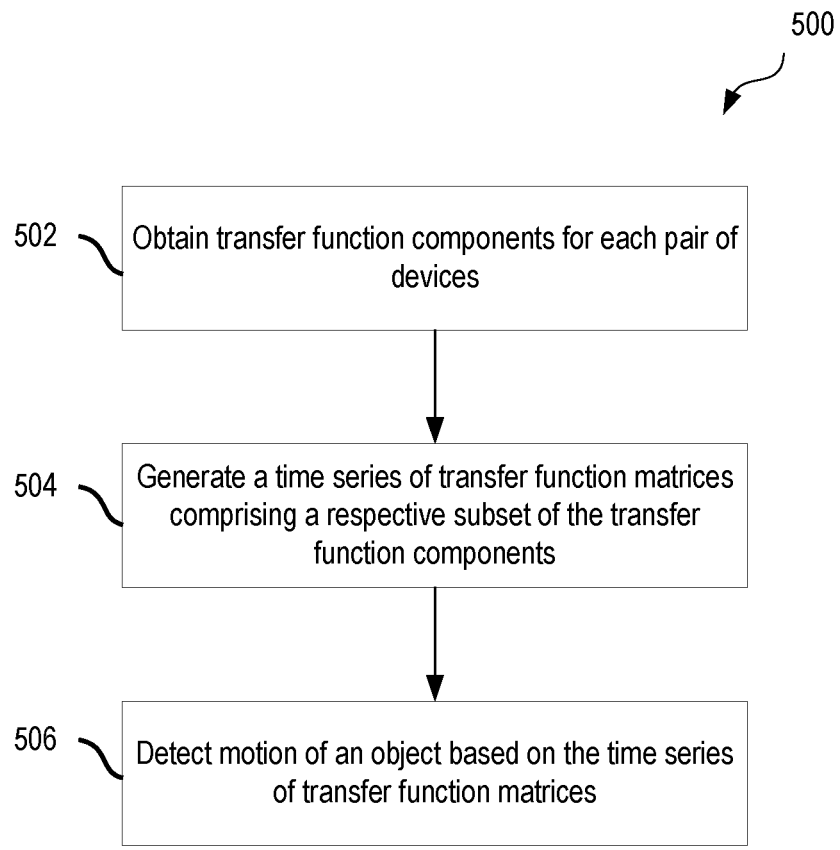
FIG. 5 is a flow diagram showing an example process for detecting motion in a mesh network.

FIG. 5 is a flow diagram showing an example process 500 for detecting motion in a mesh network. Operations of the process 500 may be performed by one or more processors of a device coupled to a wireless network that serves the space. For example, operations in the example process 500 may be performed by the processor subsystem 114 of the example wireless communication devices 102 in FIG. 1 to identify patterns in channel information for different communication links in the system 100 over time and detect whether motion has occurred in the space. The example process 500 may be performed by another type of device. The example process 500 may include additional or different operations, and the operations may be performed in the order shown or in another order. In some cases, one or more of the operations shown in FIG. 5 are implemented as processes that include multiple operations, sub-processes or other types of routines. In some cases, operations can be combined, performed in another order, performed in parallel, iterated, or otherwise repeated or performed another manner.

At 502, transfer function components (e.g. $Y_n$) are obtained for each pair of devices in a mesh network (e.g. wireless communication system 100). For instance, referring to FIG. 3, the transfer function components for each pair of devices 302 may be obtained based on wireless signals communicated through a space between the pair of devices. For example, transfer function components are obtained from wireless signals 304 communicated between device pairs, such as, wireless signals transmitted from 302A to 302C, from 302C to 302A. These transfer function components between a particular pair of devices may be represented in matrix (6) as $Y_n^{a,b}$ and $Y_n^{b,a}$.

At 504, a time series of transfer function matrices are generated. For example, matrix (6) illustrates an example transfer function matrix at a time point, e.g. matrix $Y_n(t)$. Other matrices may be generated at other time points, e.g. matrix $Y_n(t+1)$. In some cases, each transfer function matrix includes a respective subset of the transfer function components. The subset of transfer function components may include the transfer function components obtained for a certain transfer function matrix in the time series. For example, matrix $Y_n(t)$ may have different transfer function components than matrix $Y_n(t+1)$. In some cases, each matrix position in each of the transfer function matrices represents a wireless link between one of the respective pairs of devices. For example, each entry in matrix (6) represents a wireless link between two devices 302. In some cases, each of the transfer function matrices is an M×M matrix, and the mesh network comprises M wireless devices.

At 506, motion of an object in the space is detected, by operation of one or more processors, based on the time series of transfer function matrices. For example, motion may be detected based on matrices generated at different time points, e.g. matrices matrix $Y_n(t)$ and $Y_n(t+1)$. In some cases, detecting motion includes processing the time series of transfer function matrices by operation of a neural network. In some instances, detecting motion includes detecting changes of transfer function components at one or more matrix positions over the time series.

In some implementations, detecting motion may include the analysis as described with respect to step 406 of FIG. 4. For example, at 506, the transfer function components obtained in 502 may be analyzed to detect whether motion occurred in the space served by the network. The analysis may include a comparison of the snapshots of transfer function components over a time period. For instance, the difference between transfer function components at adjacent points in time may be determined, as described above with respect to Equation (7) ($\Delta Y_n(t)$). In some implementations, the transfer function components may be analyzed using a function ($f(\Delta Y)$, e.g., average, standard deviation, etc.) that is based on the comparison, as described above.

In some instances, the transfer function components obtained at 502 are further analyzed to determine a relative location of the motion detected at 506. For example, the matrix representation may be analyzed as described above with respect to Equation (8) to determine a location of detected motion relative to various wireless communication devices in the network. In some instances, a category of motion may be determined based on the analysis of the channel information. For instance, the analysis may determine that a human is moving in the space, or may determine that a dog is moving in the space (or both). Also, as further described with respect to step 406 of FIG. 4, the example process 500 of FIG. 5 for detecting motion may be implemented in a neural network.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer-readable storage medium for execution by, or to control the operation of, data-processing apparatus. A computer-readable storage medium can be, or can be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially generated propagated signal. The computer-readable storage medium can also be, or be included in, one or more separate physical components or media (e.g., multiple CDs, disks, or other storage devices). The computer-readable storage medium can include multiple computer-readable storage devices. The computer-readable storage devices may be co-located (instructions stored in a single storage device), or located in different locations (e.g., instructions stored in distributed locations).

Some of the operations described in this specification can be implemented as operations performed by a data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described, motion is detected based on received wireless signals in a mesh network.

In a first example, a set of signals are obtained based on wireless signals transmitted through a space between wireless communication devices. Each signal of the set of signals represents a transfer function for the space between a respective pair of wireless communication devices. The set of signals are analyzed to detect motion of an object in the space.

Implementations of the first example may, in some cases, include one or more of the following features. Analyzing the set of signals to detect motion of an object in the space may include generating a matrix representation of the set of signals, and analyzing changes in the matrix representation over a time period to detect whether the object moved in the space during the time period. The set of signals may be analyzed to determine a location of the detected motion. The set of signals may be analyzed to determine a category of motion. Analyzing the set of signals to detect motion of an object in the space may include providing the set of signals as input to a neural network and providing an indication of whether motion occurred in the space based on an output of the neural network.

In a second example, transfer function components are obtained for each pair of wireless communication devices in the mesh network. The transfer function components for each pair of wireless communication devices are based on wireless signals communicated through a space between the pair of wireless communication devices. A time series of transfer function matrices are generated. Each transfer function matrix includes a respective subset of the transfer function components. Motion of an object in the space is detected based on the time series of transfer function matrices.

Implementations of the second example may include one or more of the following features. The subset of transfer function components may include the transfer function components obtained for a certain transfer function matrix in the time series. Each matrix position in each of the transfer function matrices may represent a wireless link between one of the respective pairs of devices. Each of the transfer function matrices may be an M×M matrix, and the mesh network may include M wireless devices. Detecting motion may include processing the time series of transfer function matrices by operation of a neural network. Detecting motion may include detecting differences of transfer function components at one or more matrix positions over the time series. Detecting differences of transfer function components may include determining differences between transfer function components at adjacent points of the transfer function matrices in the time series In some implementations, a system (e.g., a wireless communication device, computer system or other type of system communicatively coupled to the wireless communication device) includes a data processing apparatus and memory storing instructions that are operable when executed by the data processing apparatus to perform one or more operations of the first or second example. In some implementations, a computer-readable medium stores instructions that are operable when executed by one or more processors of a data processing apparatus to perform one or more operations of the first or second example.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of embodiments have been described. Nevertheless, it will be understood that various modifications can be made. Accordingly, other embodiments are within the scope of the following claims.

What is claimed is:

1. A method of motion detection in a mesh network, comprising:
   obtaining transfer function components for each pair of devices in the mesh network, the transfer function components for each pair of devices based on wireless signals communicated through a space between the pair of devices;
   generating a time series of transfer function matrices, each transfer function matrix comprising a respective subset of the transfer function components; and
   detecting, by operation of one or more processors in a motion detection system, motion of an object in the space based on the time series of transfer function matrices.

2. The method of claim 1, wherein each subset of transfer function components comprises the transfer function components obtained for a certain transfer function matrix in the time series.

3. The method of claim 1, wherein each matrix position in each of the transfer function matrices represents a wireless link between one of the respective pairs of devices.

4. The method of claim 1, wherein each of the transfer function matrices is an M×M matrix, and the mesh network comprises M wireless devices.

5. The method of claim 1, wherein detecting motion comprises processing the time series of transfer function matrices by operation of a neural network.

6. The method of claim 1, wherein detecting motion comprises detecting differences of transfer function components at one or more matrix positions over the time series.

7. The method of claim 6, wherein detecting differences of transfer function components comprises determining differences between transfer function components at adjacent points of the transfer function matrices in the time series.

8. A motion detection system comprising:
   one or more processors;
   memory storing instructions, which when executed by the one or more processors, cause the one or more processors to:
      obtain transfer function components for each pair of devices in a mesh network, the transfer function components for each pair of devices based on wireless signals communicated through a space between the pair of devices;
      generate a time series of transfer function matrices, each transfer function matrix comprising a respective subset of the transfer function components; and
      detect motion of an object in the space based on the time series of transfer function matrices.

9. The motion detection system of claim 8, wherein each subset of transfer function components comprises the transfer function components obtained for a certain transfer function matrix in the time series.

10. The motion detection system of claim 8, wherein each matrix position in each of the transfer function matrices represents a wireless link between one of the respective pairs of devices.

11. The motion detection system of claim 8, wherein each of the transfer function matrices is an M×M matrix, and the mesh network comprises M wireless devices.

12. The motion detection system of claim 8, wherein detecting motion comprises processing the time series of transfer function matrices by operation of a neural network.

13. The motion detection system of claim 8, wherein detecting motion comprises detecting differences of transfer function components at one or more matrix positions over the time series.

14. The motion detection system of claim 13, wherein detecting differences of transfer function components comprises determining differences between transfer function components at adjacent points of the transfer function matrices in the time series.

15. A non-transitory computer readable medium comprising instructions which when executed by one or more processors cause the one or more processors to:
   obtain transfer function components for each pair of devices in a mesh network, the transfer function components for each pair of devices based on wireless signals communicated through a space between the pair of devices;
   generate a time series of transfer function matrices, each transfer function matrix comprising a respective subset of the transfer function components; and
   detect motion of an object in the space based on the time series of transfer function matrices.

16. The non-transitory computer readable medium of claim 15, wherein each subset of transfer function components comprises the transfer function components obtained for a certain transfer function matrix in the time series.

17. The non-transitory computer readable medium of claim 15, wherein each matrix position in each of the transfer function matrices represents a wireless link between one of the respective pairs of devices.

18. The non-transitory computer readable medium of claim 15, wherein each of the transfer function matrices is an M×M matrix, and the mesh network comprises M wireless devices.

19. The non-transitory computer readable medium of claim 15, wherein detecting motion comprises processing the time series of transfer function matrices by operation of a neural network.

20. The non-transitory computer readable medium of claim 15, wherein detecting motion comprises detecting differences of transfer function components at one or more matrix positions over the time series.

21. The non-transitory computer readable medium of claim 20, wherein detecting differences of transfer function components comprises determining differences between transfer function components at adjacent points of the transfer function matrices in the time series.

\* \* \* \* \*